(12) United States Patent
Toba et al.

(10) Patent No.: US 10,983,283 B2
(45) Date of Patent: Apr. 20, 2021

(54) OPTICAL COMMUNICATION CONNECTOR, OPTICAL COMMUNICATION CABLE, AND ELECTRONIC DEVICE

(71) Applicant: SONY CORPORATION, Tokyo (JP)

(72) Inventors: Kazuaki Toba, Kanagawa (JP); Masanari Yamamoto, Kanagawa (JP); Ryohei Takahashi, Kanagawa (JP); Satoshi Muto, Chiba (JP); Tatsushi Nashida, Kanagawa (JP); Shinpei Hirano, Tokyo (JP); Naofumi Yoneda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/708,631

(22) Filed: Dec. 10, 2019

(65) Prior Publication Data

US 2020/0110221 A1 Apr. 9, 2020

Related U.S. Application Data

(63) Continuation of application No. 15/761,186, filed as application No. PCT/JP2016/076295 on Sep. 7, 2016, now Pat. No. 10,502,902.

(30) Foreign Application Priority Data

Sep. 30, 2015 (JP) ................. 2015-194460

(51) Int. Cl.
*G02B 6/32* (2006.01)
*G02B 6/44* (2006.01)
*G02B 6/42* (2006.01)

(52) U.S. Cl.
CPC ............... *G02B 6/32* (2013.01); *G02B 6/42* (2013.01); *G02B 6/4214* (2013.01); *G02B 6/44* (2013.01);
(Continued)

(58) Field of Classification Search
CPC .......... G02B 6/32; G02B 6/4214; G02B 6/42; G02B 6/44; G02B 6/4292; G02B 2006/4297
See application file for complete search history.

(56) References Cited

U.S. PATENT DOCUMENTS 3,419,321 A 12/1968 Barber
3,508,807 A 4/1970 Mayer
(Continued)

FOREIGN PATENT DOCUMENTS

JP 59-211012 A 11/1984
JP 2008-145678 A 6/2008
(Continued)

OTHER PUBLICATIONS

International Preliminary Report on Patentability of PCT Application No. PCT/JP2016/076295, dated Apr. 12, 2018, 07 pages of English Translation and 04 pages of IPRP.
(Continued)

*Primary Examiner* — Andrew Jordan
(74) *Attorney, Agent, or Firm* — Chip Law Group

(57) ABSTRACT

[Object] To propose an optical communication connector, an optical communication cable, and an electronic device being novel and improved that have excellent maintenance properties and can prevent parallel light (collimated light) from being directly emitted to the outside of an optical connector during non-optical coupling. [Solution] There is provided an optical communication connector device including: a collimating lens configured to collimate light from an optical transmission path; a refracting section arranged on a leading end side with respect to the collimating lens, and configured to refract and eject light from the optical transmission path
(Continued)

ejected from the collimating lens; and a scattering section configured to scatter at least a part of the light ejected from the refracting section.

11 Claims, 10 Drawing Sheets

(52) U.S. Cl.
CPC .... *G02B 6/4292* (2013.01); *G02B 2006/4297* (2013.01)

(56) References Cited

U.S. PATENT DOCUMENTS

| | | | |
|---|---|---|---|
| 3,547,526 A | 12/1970 | Devereux | |
| 3,980,391 A | 9/1976 | Stewart | |
| 4,128,302 A | 12/1978 | Di Vita | |
| 4,183,618 A | 1/1980 | Rush et al. | |
| 4,255,021 A | 3/1981 | Brunsden | |
| 4,294,511 A | 10/1981 | Yamashita et al. | |
| 4,420,219 A | 12/1983 | Muchel | |
| 4,476,519 A | 10/1984 | Hayamizu | |
| 4,627,068 A | 12/1986 | Johnson et al. | |
| 4,636,611 A | 1/1987 | Penney | |
| 4,637,691 A | 1/1987 | Uehara et al. | |
| 4,721,359 A | 1/1988 | Nishioka et al. | |
| 4,732,452 A | 3/1988 | Carter | |
| 4,814,118 A | 3/1989 | Plummer et al. | |
| 4,834,484 A | 5/1989 | Gorman et al. | |
| 4,859,029 A | 8/1989 | Durell | |
| 4,868,361 A | 9/1989 | Chande et al. | |
| 4,961,622 A | 10/1990 | Gorman et al. | |
| 5,046,817 A | 9/1991 | Uenishi et al. | |
| 5,101,393 A | 3/1992 | Marshall | |
| 5,307,435 A | 4/1994 | Chihara | |
| 5,592,328 A | 1/1997 | Greenberg | |
| 5,751,869 A | 5/1998 | Li et al. | |
| 5,892,620 A | 4/1999 | Stone | |
| 5,953,166 A | 9/1999 | Shikano | |
| 6,438,290 B1 | 8/2002 | Bietry et al. | |
| 7,286,730 B2 | 10/2007 | Cai et al. | |
| 7,586,604 B2 | 9/2009 | Sharpe et al. | |
| 7,589,915 B2 | 9/2009 | Shimoguchi | |
| 7,603,006 B2 | 10/2009 | Cai et al. | |
| 7,748,913 B2 | 7/2010 | Oba | |
| 7,991,257 B1 | 8/2011 | Coleman | |
| 7,995,298 B2 | 8/2011 | Chen | |
| 8,177,408 B1 | 5/2012 | Coleman | |
| 8,249,408 B2 | 8/2012 | Coleman | |
| 8,457,457 B2 | 6/2013 | Morioka | |
| 9,025,917 B2 | 5/2015 | Aoki et al. | |
| 9,122,031 B2 | 9/2015 | Wu | |
| 9,557,488 B2 | 1/2017 | Demeritt et al. | |
| 9,791,632 B2 | 10/2017 | Jacobsson | |
| 9,897,768 B2 | 2/2018 | Kasai | |
| 2002/0172451 A1 | 11/2002 | Gupta et al. | |
| 2002/0176651 A1 | 11/2002 | Scott et al. | |
| 2002/0176657 A1 | 11/2002 | Burke et al. | |
| 2004/0091815 A1 | 5/2004 | Yamamoto et al. | |
| 2004/0096666 A1 | 5/2004 | Knox et al. | |
| 2006/0072878 A1 | 4/2006 | Dames et al. | |
| 2007/0217735 A1 | 9/2007 | Cai et al. | |
| 2008/0037932 A1 | 2/2008 | Cai et al. | |
| 2008/0138091 A1 | 6/2008 | Shimoguchi | |
| 2009/0074362 A1 | 3/2009 | Oba | |
| 2013/0071063 A1 | 3/2013 | Aoki et al. | |
| 2014/0321816 A1 | 10/2014 | Wu | |
| 2017/0153400 A1 | 6/2017 | Kasai | |
| 2018/0259715 A1 | 9/2018 | Toba et al. | |
| 2020/0110221 A1* | 4/2020 | Toba | G02B 6/44 |

FOREIGN PATENT DOCUMENTS

| | | |
|---|---|---|
| JP | 2014-063124 A | 4/2014 |
| WO | 2015/133164 A1 | 9/2015 |

OTHER PUBLICATIONS

Office Action for JP Patent Application No. 2017-543058, dated Jun. 2, 2020, 4 pages of Office Action and 4 pages of English Translation.

* cited by examiner

OPTICAL COMMUNICATION CONNECTOR, OPTICAL COMMUNICATION CABLE, AND ELECTRONIC DEVICE

CROSS REFERENCE TO RELATED APPLICATIONS

The present application is a continuation application of U.S. patent application Ser. No. 15/761,186, filed Mar. 19, 2018, which is a U.S. National Phase of International Patent Application No. PCT/JP2016/076295 filed Sep. 7, 2016, which claims priority benefit of Japanese Patent Application No. JP 2015-194460 filed in the Japan Patent Office on Sep. 30, 2015. Each of the above-referenced applications is hereby incorporated herein by reference in its entirety.

TECHNICAL FIELD

The present disclosure relates to an optical communication connector, an optical communication cable, and an electronic device.

BACKGROUND ART

Recently, there is a demand for a larger transmission capacity along with the increase in the amount of communication over the Internet and the like. In conventional transmission systems via copper cables, it is becoming difficult to achieve such a large transmission capacity. Therefore, optical communication that can achieve a larger transmission capacity has been proposed.

A so-called physical contact (PC) system of abutting optical fibers to each other in a connector is adopted for optical communication cables generally used at present. In the PC system, however, highly-accurate adjustment is required for aligning the both optical fibers. In addition, in the abutment of the optical fibers, the both optical fibers need cleaning every time connection is made in order to prevent waste or the like from adhering to the tips of the optical fibers to damage the optical fibers. Further, in the PC system, in order to suppress a coupling failure in a gap between the leading ends of the optical fibers, injection of a refractive index adjuster into the gap is indispensable. From these results, it is difficult for general users to insert and remove optical fibers by the PC system.

As a method for solving these problems, a collimating optical coupling system has been proposed. In the collimating optical coupling system, each lens is mounted with the optical axis aligned at the tip of each optical fiber, and an optical signal is turned into parallel light to transfer the optical signal between opposed lenses. By using such a collimating optical coupling system, the accuracy in aligning connectors of optical fibers to each other is relaxed. Further, in the collimating optical coupling system, since optical fibers are optically coupled to each other in a contactless state, an adverse effect on transmission quality caused by waste or the like intruded between the optical fibers is also suppressed, and the need for frequent and careful cleaning is also eliminated.

In the meanwhile, parallel light used in the collimating optical coupling system is theoretically less likely to attenuate even at a distance from an output section, and, depending on the intensity, it is difficult to satisfy standards concerning laser light, such as IEC 60825-1 and IEC 60825-2. Therefore, at present, a shutter for shielding parallel light during disconnection is provided for an optical communication connector.

In addition, Patent Literature 1 proposes an optical connector having an object to prevent laser hazard due to collimated light (parallel light). Specifically, an optical connector for performing collimating optical coupling is disclosed in which opposed two projection-recess structures are provided for an optical fiber fixing section and a collimating lens. In this optical connector, during disconnection of the optical connector, the collimating lens separates from the optical fiber fixing section, and the projection-recess structures scatter light from optical fibers. On the other hand, in this optical connector, during connection of the optical connector, the collimating lens is pressed, so that the collimating lens comes into contact with the optical fiber fixing section with the two projection-recess structures interposed therebetween to eject parallel light.

CITATION LIST

Patent Literature

Patent Literature 1:
JP 2013-64803A

DISCLOSURE OF INVENTION

Technical Problem

In the optical connector described in Patent Literature 1, however, by pressing the collimating lens even during disconnection, the collimating lens can come into contact with the optical fiber fixing section with the two projection-recess structures interposed therebetween, and collimated light may be emitted from the optical connector. In addition, the optical connector described in Patent Literature 1 has a complicated structure that requires a mechanism for moving the collimating lens away from and close to the optical fiber fixing section, and the like.

In addition, in the optical connector described in Patent Literature 1, the collimating lens is exposed to the outside. Therefore, the collimating lens surface can be contaminated by dust, oil, or the like. The collimating coupling system has a resistance to soil as compared with the PC system. However, under use conditions according to a commercial standard with relatively high frequency of insertion and removal, cleaning is not at all unnecessary. In addition, when a scratch or the like is made on the collimating lens, the signal quality is affected. Therefore, the optical connector described in the Literature requires cleaning when soiling occurs on the collimating lens. In such cleaning, in a case where the optical connector is reduced in size or a plurality of lenses are arranged, maintenance of the lens section becomes very difficult. In addition, in a case where a shutter is installed in the optical connector, a jig or the like for releasing the shutter becomes necessary in some cases.

Therefore, the present disclosure proposes an optical communication connector, an optical communication cable, and an electronic device being novel and improved that have excellent maintenance properties and can prevent parallel light (collimated light) from being directly emitted to the outside of an optical connector during non-optical coupling.

Solution to Problem

According to the present disclosure, there is provided an optical communication connector device including: a collimating lens configured to collimate light from an optical transmission path; a refracting section arranged on a leading end side with respect to the collimating lens, and configured to refract and eject light from the optical transmission path ejected from the collimating lens; and a scattering section configured to scatter at least a part of the light ejected from the refracting section.

In addition, according to the present disclosure, there is provided an optical communication cable including: an optical transmission path; and an optical communication connector including a collimating lens configured to collimate light from the optical transmission path, a refracting section arranged on a leading end side with respect to the collimating lens and configured to refract and eject light from the optical transmission path passing through the collimating lens, and a scattering section configured to scatter at least a part of the light ejected from the refracting section.

In addition, according to the present disclosure, there is provided an electronic device including: an optical communication connector including a collimating lens configured to collimate light from an optical transmission path, a refracting section arranged on a leading end side with respect to the collimating lens and configured to refract and eject the light from the optical transmission path passing through the collimating lens, and a scattering section configured to scatter at least a part of the light ejected from the refracting section.

Advantageous Effects of Invention

According to the present disclosure as described above, an optical communication connector, an optical communication cable, and an electronic device being novel and improved that have excellent maintenance properties and can restrain parallel light (collimated light) from being directly emitted to the outside of an optical connector during non-optical coupling can be provided.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
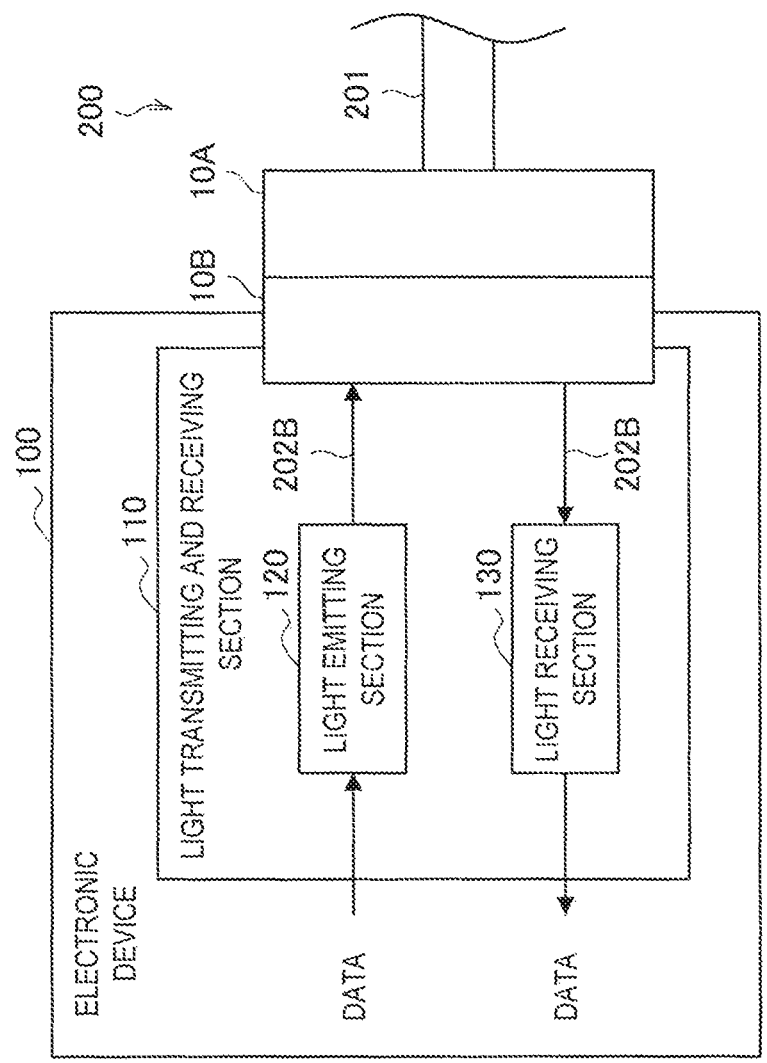
FIG. 1 is an appearance example of an electronic device and an optical communication cable according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in the present specification and drawings, similar structural elements according to different embodiments are distinguished by adding different alphabets after the same reference numerals. However, in a case where it is not particularly necessary to distinguish between a plurality of structural elements and the like that have substantially the same function and structure, the same reference numerals are merely given. Note that, in the drawings, members that are not necessary to describe are omitted as necessary for ease of description. In addition, dimensions of each of the illustrated members are enlarged or reduced as necessary for ease of description, and do not indicate an actual size of each member.

Note that description will be provided in the following order.
1. First embodiment
1.1. Appearance example of electronic device and optical communication cable
1.2. Structures of electronic device and optical communication cable
(Optical communication connector)
(Electronic device)
(Optical communication cable)
2. Second embodiment
3. Application examples

[1. Appearance Example of Electronic Device and Optical Communication Cable]

First, with reference to FIG. 1, an appearance example of an electronic device 100 and an optical communication cable 200 according to a first embodiment of the present disclosure will be described.

As illustrated in FIG. 1, the electronic device 100 includes a light transmitting and receiving section 110. The light transmitting and receiving section 110 is configured to be capable of performing optical communication. In addition, the light transmitting and receiving section 110 includes an optical communication connector 10B. The light transmitting and receiving section 110 can issue data that the electronic device 100 needs to transmit as an optical signal via the optical communication connector 10B, and can receive an optical signal to the electronic device 100.

The optical communication cable 200 includes a cable body 201 and an optical communication connector 10A. The optical communication cable 200 transmits an optical signal between the electronic device 100 and another electronic device or a communication network such as the Internet via the cable body 201 and the optical communication connector 10A.

Note that the electronic device 100 can be, for example, a mobile electronic device such as a mobile phone, a smartphone, a PHS, a PDA, a tablet PC, a laptop computer, a video camera, an IC recorder, a portable media player, an electronic notebook, an electronic dictionary, a calculator, or a portable game console, or another electronic device such as a desktop computer, a display device, a television receiver, a radio receiver, a video recorder, a printer, a car navigation system, a game console, a router, a hub, or an optical network unit (ONU). Alternatively, the electronic device 100 can constitute a part or the whole of an electrical appliance such as a refrigerator, a washing machine, a clock, an interphone, air-conditioning equipment, a humidifier, an air purifier, lighting equipment, or a cooking appliance, or a vehicle as will be described later.

[1.2. Structures of Electronic Device and Optical Communication Cable]

Figure 2:
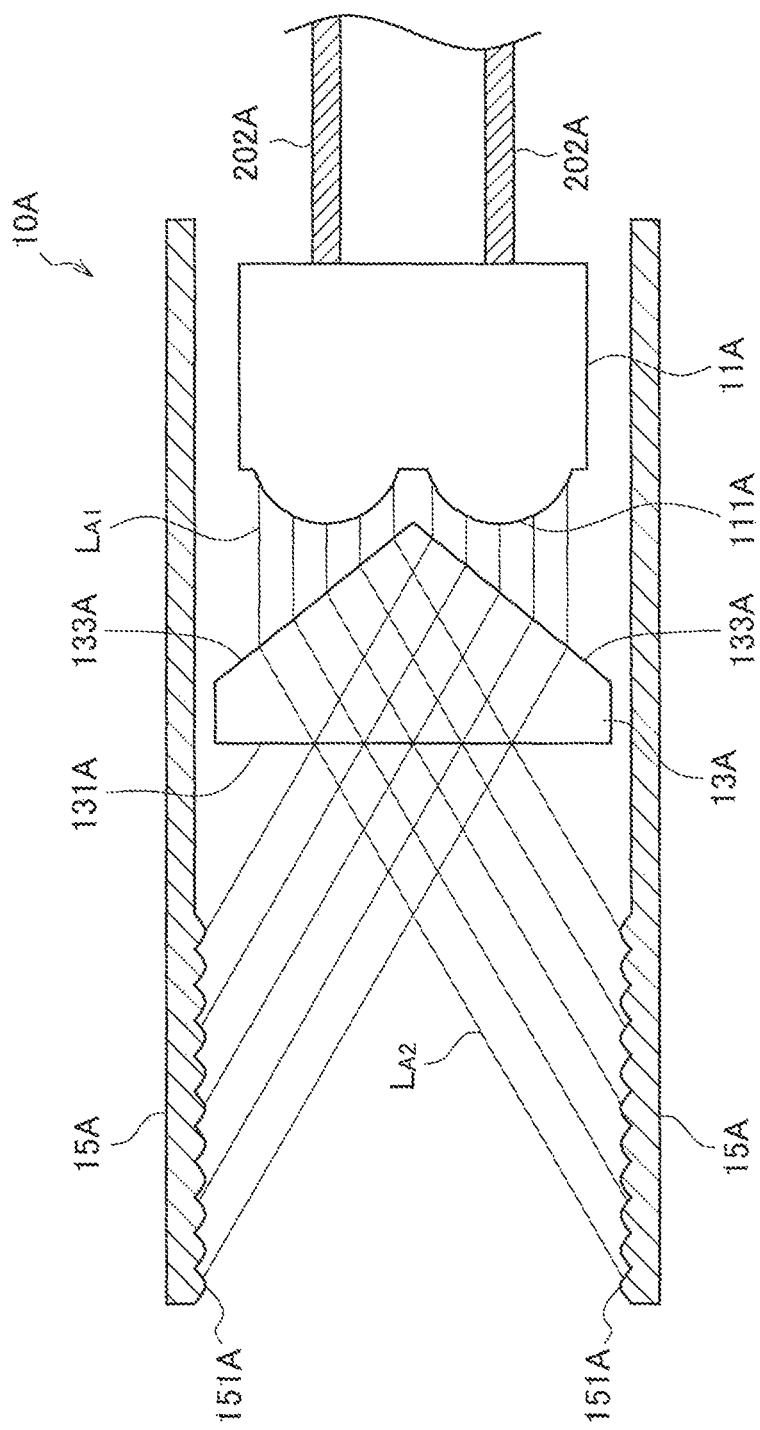
FIG. 2 is an enlarged sectional view of the optical communication connector illustrated in FIG. 1.
Figure 3:
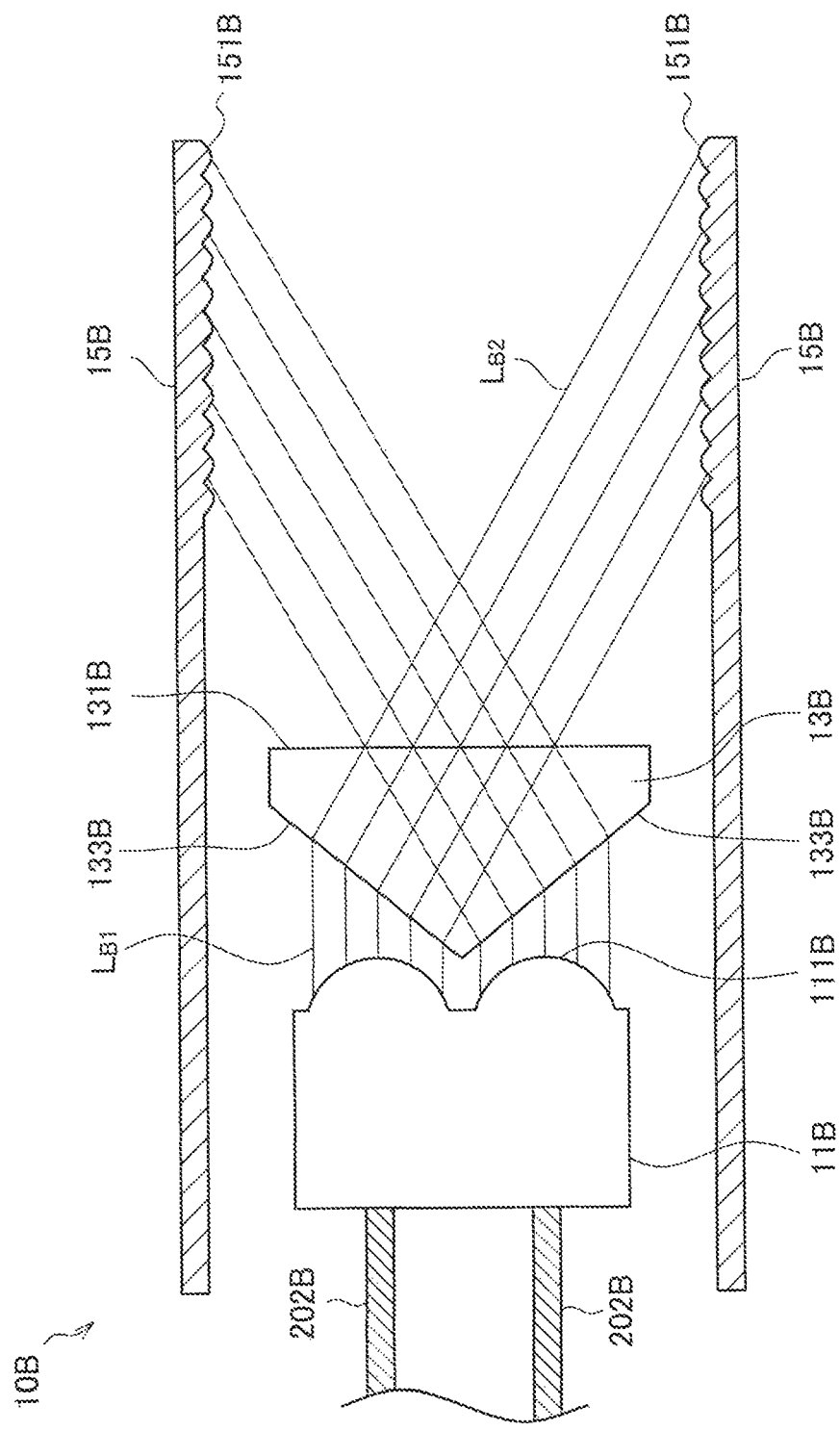
FIG. 3 is an enlarged sectional view of the optical communication connector illustrated in FIG. 1.
Figure 4:
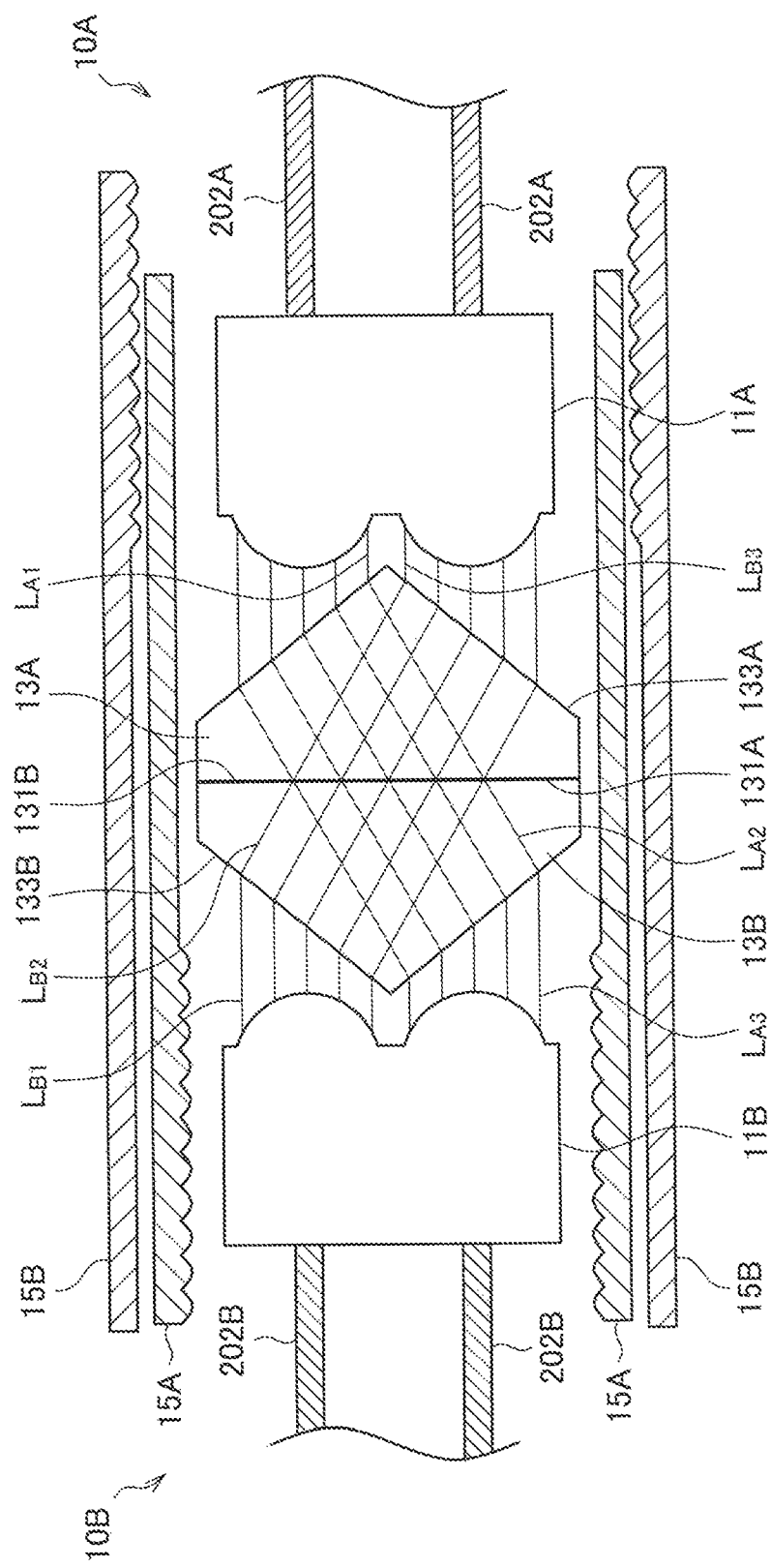
FIG. 4 is an enlarged sectional view illustrating a connection state of the optical communication connector illustrated in FIG. 1.

Next, with reference to FIG. 2 to FIG. 4 in addition to FIG. 1, structures of the electronic device 100 and the optical communication cable 200 will be described. FIG. 2 is an enlarged sectional view of the optical communication connector 10A illustrated in FIG. 1, FIG. 3 is an enlarged sectional view of the optical communication connector 10B illustrated in FIG. 1, and FIG. 4 is an enlarged sectional view illustrating a connection state of the optical communication connectors 10A and 10B illustrated in FIG. 1. Hereinafter, the optical communication connectors 10A, 10B will be described first in detail, and then the electronic device 100 and the optical communication cable 200 including them will be described in detail.

(Optical Communication Connector)

Hereinafter, the optical communication connectors 10A, 10B will be described in detail. In addition, since the optical communication connectors 10A, 10B have a common structure, the structure of the optical communication connector 10A will be mainly described.

FIG. 1, the optical communication connector 10A is a plug provided on the leading end side of the cable body 201. As illustrated in FIG. 2, the optical communication connector 10A mainly has a lens section 11A, a refracting section 13A, and a scattering member 15A. Note that the optical communication connector 10A may include as necessary a positioning member for positioning each member, a protection member for protecting each member, a casing for carrying each member, and the like, in addition to the above-described components.

The lens section 11A is arranged so as to come into contact with the leading end side of an optical transmission path 202A existing in the cable body 201. In a collimating lens 111A on the leading end side, the lens section 11A converts light of an optical signal ejected from the optical transmission path 202A into a parallel light (collimated light) $L_{A1}$ and emits the parallel light. On the other hand, when parallel light is input to the collimating lens 111A on the leading end side, the lens section 11A collects the parallel light for ejection toward the optical transmission path 202A.

Note that two collimating lenses 111A are illustrated in the drawing, whilst the illustrated mode is not a limitation, but the lens section 11A can have one or more collimating lenses of any number in accordance with the number of the optical transmission paths 202A. For example, the lens section 11A may be a micro lens array in which collimating lenses are arrayed in the thickness direction and in the width direction of the optical communication connector 10A. For example, the lens section 110A may be a micro lens array in which two columns of collimating lenses are arrayed in the thickness direction (the vertical direction in the drawing) and a plurality of rows of collimating lenses are arrayed in the width direction (the depth direction in the drawing).

The refracting section 13A is a prism structured and arranged so as to refract and eject a parallel light $L_{A1}$ ejected from the lens section 11A. The refracting section 13A is arranged on the leading end side with respect to the lens section 11A. In addition, the refracting section 13A is extended in the width direction (the depth direction in the drawing) as necessary so as to be capable of receiving the parallel light $L_{A1}$ from each of the collimating lenses 111A arranged in the lens section 110A. Note that the illustrated mode is not a limitation, but in a case where three or more collimating lenses 111A, for example, are arranged in the thickness direction, or in a case where only one collimating lens 111A is arranged, the refracting section 13A can be extended or shortened in the thickness direction in correspondence to this.

A surface of the refracting section 13A on the leading end side, that is, on the ejection side of a refracted light $L_{A2}$ which will be described later, forms such a flat surface 131A that is substantially perpendicular to the parallel light $L_{A1}$ ejected by the above-described collimating lens 111A.

In addition, in the refracting section 13A, an anti-reflection section may be formed in the flat surface 131A on the leading end side. Accordingly, when receiving an optical signal from the optical communication connector 10B, the optical signal can be input to the refracting section 13A efficiently. In addition, such an anti-reflection section can be achieved by an anti-reflection film or a minute concavo-convex structure of a cycle of less than 1 μm, for example, a moth-eye structure or the like.

In addition, in the refracting section 13A, a surface protection section may be formed in the flat surface 131A on the leading end side. Accordingly, the refracting section 13A is prevented from being damaged unintentionally, and the refracted light $L_{A2}$ is emitted more uniformly, as a result of which the optical signal is improved in quality. Such a surface protection section can be achieved by a transparent resin film of an acrylic resin or the like or a transparent coating of an inorganic material, for example.

On the other hand, the base end side of the refracting section 13A, that is, a surface on the input side of the parallel light $L_{A1}$ includes a plurality of refracting surfaces 133A having different incident angles from one another with respect to the parallel light $L_{A1}$. In the present embodiment, the surface of the refracting section 13A on the base end side includes two refracting surfaces 133A that are inclined to the leading end side from the center in the thickness direction toward the end portion side to form a projecting portion. With such refracting surfaces 133A, the parallel light $L_{A1}$ is refracted to turn into the refracted light $L_{A2}$, and is ejected from the flat surface 131A.

In addition, the two refracting surfaces 133A are adjusted in angle such that the refracted lights $L_{A2}$ refracted by the two refracting surfaces 133A cross near the center in the thickness direction. In this manner, by refracting the parallel light $L_{A1}$ such that the refracted lights $L_{A2}$ cross, receipt of the refracted light $L_{A2}$ by the optical communication connector 10B which will be described later is facilitated. Further, in the present embodiment, the parallel lights $L_{A1}$ ejected by one collimating lens 111A are all input to the same refracting surface 133A. Accordingly, since one optical signal travels along one optical path, that is, one optical signal is prevented from being branched into a plurality of portions and then integrated, the optical signal has low noise.

In addition, the refracting section 13A can include a transparent resin material such as polycarbonate, a glass material such as BK7, synthetic quartz, anhydrous synthetic quartz, or alkali aluminosilicate, or another transparent inorganic material. In particular, polycarbonate is excellent in mechanical strength, processability, and transparency, and is suitable as a constituent material of the refracting section 13A.

The scattering members 15A are two plate-like members arranged with the refracting section 13A interposed therebetween. The scattering member 15A is arranged such that a surface of the scattering member 15A on the leading end portion side faces any of the refracting surfaces 133A of the refracting section 13A so as to be irradiated with the refracted light $L_{A2}$ passing through the refracting section 13A. In the present embodiment, the scattering member 15A is formed so as to be extended to the leading end side with respect to the refracting section 13A at such an angle that an intersection line of a plane including the refracting surfaces 133A and a plane including the inner surface of the scattering member 15A is in parallel to the width direction of the optical communication connector 10A.

In addition, the scattering member 15A has a scattering section 151A that scatters the refracted light $L_{A2}$ at a location irradiated with the refracted light $L_{A2}$. Accordingly, as illustrated in FIG. 2, the parallel light $L_{A1}$ collimated by the collimating lens 111A is scattered in the scattering section 151A when the optical communication connector 10B is not connected. As a result, the collimated parallel light $L_{A1}$ and the refracted light $L_{A2}$ are prevented from being unintentionally emitted directly to the outside of the optical communication connector 10A.

The scattering section 151A is not particularly limited as long as light is scattered, but can be a porous film such as a rough surface or an alumite layer, for example. In particular, an alumite layer can be formed easily and inexpensively, and has excellent light scattering properties.

A constituent material of the scattering member 15A is not particularly limited, but can be a metallic material, for example. Note that in a case where the scattering section 151A is an alumite layer, the scattering member 15A includes aluminum.

The optical communication connector 10B illustrated in FIG. 3 is a receptacle arranged on a side surface of the electronic device 100. The optical communication connector 10B has a structure substantially similar to that of the above-described optical communication connector 10A. For example, the structures of a lens section 11B and a refracting section 13B are substantially similar to those of the lens section 11A and the refracting section 13A. On the other hand, a scattering section 15B has a gap between the lens section 11B and the refracting section 13B such that, when the optical communication connector 10A as illustrated in FIG. 4 is connected, the leading end portion of the scattering member 15A can be inserted in between the scattering section 15B, and the lens section 11B and the refracting section 13B.

Each structure of the optical communication connectors 10A and 10B has been described above. In a case where the optical communication connectors 10A, 10B are not connected by the refracting sections 13A, 13B, and the scattering sections 151A and 151B to each other, that is, during non-optical coupling, parallel lights are prevented from being directly emitted to the outside of the optical communication connectors 10A, 10B as described above. Accordingly, even in a case where the strength of the parallel lights $L_{A1}$, $L_{B1}$ generated by the collimating lenses 111A, 111B is relatively great, the parallel lights $L_{A1}$, $L_{B1}$ are prevented from being directly input to eyeballs or the like, for example, of a user, and thus, an unintentional health damage can be prevented.

In the meanwhile, in general, the output light intensity of parallel light (laser light) does not degrade theoretically. Therefore, there is a risk that a health damage occurs when laser light is input to eyeballs, for example, of a user. For this reason, there exist standards that define safety of laser products as international standards (IEC 60825-1,2). The optical communication connectors 10A and 10B easily satisfy such international standards by means of the above-described refracting sections 13A, 13B, and scattering sections 151A and 151B.

On the other hand, as illustrated in FIG. 4 and as will be described later, when the optical communication connectors 10A, 10B are connected, an optical signal passing through the two refracting sections 13A, 13B turns into parallel light again, and optical coupling becomes possible.

As illustrated in FIG. 4, the optical communication connectors 10A, 10B are arranged such that, when they are connected, the refracting sections 13A, 13B are symmetric and the flat surfaces 131A, 131B are opposed. In this case, first, light discharged from the optical transmission path 202A is collimated in the lens section 11A to turn into the parallel light $L_{A1}$. Then, the parallel light $L_{A1}$ is input to the refracting section 13A, and is refracted by the refracting surfaces 133A to turn into the refracted light $L_{A2}$. Then, the refracted light $L_{A2}$ passes through the flat surface 131A to be input to the refracting section 13B through a flat surface 131B. The input refracted light $L_{A2}$ is refracted again in a refracting surface 133B to turn into a parallel light $L_{A3}$ parallel to $L_{A1}$. The parallel light $L_{A3}$ is collected in the lens section 11B, and is transported to the optical transmission path 202B.

Similarly, light discharged from the optical transmission path 202B is collimated in the lens section 11B to turn into a parallel light $L_{B1}$. Then, the parallel light $L_{B1}$ is input to the refracting section 13B, and is refracted by the refracting surface 133B to turn into a refracted light $L_{B2}$. Then, the refracted light $L_{B2}$ passes through the flat surface 131B to be input to the refracting section 13A through the flat surface 131A. The input refracted light $L_{B2}$ is refracted again in the refracting surfaces 133A to turn into a parallel light $L_{B3}$ parallel to $L_{B1}$. The parallel light $L_{B3}$ is collected in the lens section 11A, and is transmitted to the optical transmission path 202A. From the foregoing, bidirectional transmission of an optical signal between the electronic device 100 and the optical communication cable 200 via the optical communication connectors 10A, 10B becomes possible.

In addition, in the optical communication connectors 10A, 10B, the collimating lenses 111A, 111B and the optical transmission paths 202A, 202B are not exposed to an external environment since the refracting sections 13A, 13B are arranged on the leading end side. Therefore, intrusion of dirt or dust into the optical transmission paths 202A, 202B and the collimating lenses 111A, 111B is prevented, and adhesion of oil or the like is suppressed, as a result of which the need for cleaning them is eliminated, and maintenance properties are excellent. Further, since the leading end sides of the refracting sections 13A, 13B form the flat surfaces 131A, 131B, soil such as dirt or dust is less likely to accumulate.

Further, in the optical communication connectors 10A, 10B, the refracting sections 13A, 13B, and the lens sections 11A, 11B in charge of light transmission between the optical transmission paths 202A and 202B have an identical shape to each other. Therefore, when manufacturing an optical communication connector set including the optical communication connector 10A and the optical communication connector 10B, components required to have high dimensional accuracy can be manufactured in common. Therefore, optical coupling quality of such an optical communication connector set can be increased.

The optical communication connectors 10A, 10B as described above have excellent maintenance properties, and are capable of performing collimating optical coupling. In addition, because of not having a movable member for shielding parallel light, the optical communication connectors 10A, 10B have a simple mechanism, and are less likely to break down. Therefore, the optical communication connectors 10A, 10B are suitable for commercial optical communication application in which insertion and removal of the optical communication cable 200 are performed relatively frequently.

(Electronic Device)

Next, a configuration of the electronic device 100 according to the present embodiment will be described. As illustrated in FIG. 1 and as described above, the electronic device 100 includes the light transmitting and receiving section 110. The light transmitting and receiving section 110 includes an optical signal light emitting section 120, an optical signal light receiving section 130, and the optical communication connector 10B as a receptacle.

The light emitting section 120 outputs data to be transmitted in the electronic device 100 as an optical signal, and inputs the optical signal to the optical communication connector 10B via the optical transmission path 202B arranged on the leading end side of the light emitting section 120.

In addition, the light receiving section 130 receives the optical signal from the optical communication connector 10B via the optical transmission path 202B, and outputs the optical signal to an interface in the electronic device 100.

Figure 5:
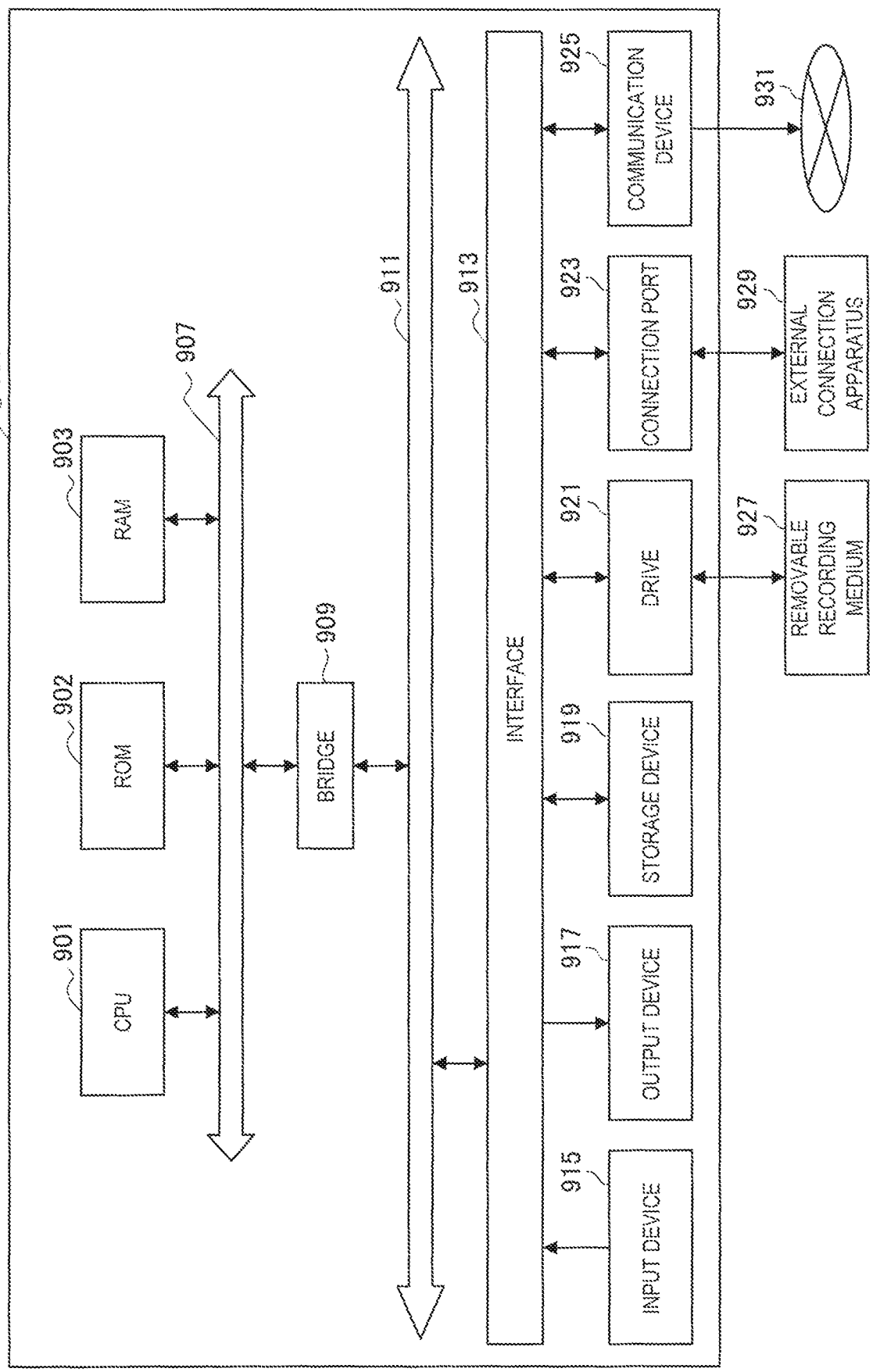
FIG. 5 is a block diagram for describing a hardware configuration of the electronic device according to the first embodiment of the present disclosure.

In addition, a detailed hardware configuration of the electronic device 100 is not particularly limited, but can be one as illustrated in FIG. 5, for example. FIG. 5 is a block diagram for describing a hardware configuration of the electronic device 100 according to the first embodiment of the present disclosure.

The electronic device 100 mainly includes a CPU 901, a ROM 902, and a RAM 903. Furthermore, the electronic device 100 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing apparatus and a control apparatus, and controls the overall operation or a part of the operation of the electronic device 100 according to various programs recorded in the ROM 902, the RAM 903, the storage device 919, or a removable recording medium 927. The ROM 902 stores programs, operation parameters, and the like used by the CPU 901. The RAM 903 primarily stores programs used the CPU 901 and parameters and the like varying as appropriate during the execution of the programs. These are connected with each other via the host bus 907 including an internal bus such as a CPU bus.

The host bus 907 is connected to the external bus 911 such as a PCI (Peripheral Component Interconnect/Interface) bus via the bridge 909.

The input device 915 is an operation means operated by a user, such as a mouse, a keyboard, a touch panel, buttons, a switch and a lever, for example. Also, the input device 915 may be a remote control means (a so-called remote controller) using, for example, infrared light or other radio waves, or may be an external connection apparatus 929 such as a mobile phone or a PDA conforming to the operation of the electronic device 100. Furthermore, the input device 915 generates an input signal on the basis of, for example, information which is input by a user with the above operation means, and includes an input control circuit or the like for outputting the input signal to the CPU 901. The user of the electronic device 100 can input various data to the electronic device 100 and can instruct the electronic device 100 to perform various types of processing by operating this input device 915.

The output device 917 includes a device capable of visually or audibly notifying a user of acquired information. Such a device includes a display device such as a CRT display device, a liquid crystal display device, a plasma display device, an EL display device and a lamp, an audio output device such as a speaker and a headphone, a printer, a mobile phone, a facsimile machine, and the like. For example, the output device 917 outputs a result obtained by various types of processing performed by the electronic device 100. Specifically, the display device displays, in the form of text or images, a result obtained by various types of processing performed by the electronic device 100. On the other hand, the audio output device converts an audio signal including reproduced audio data, sound data, and the like into an analog signal, and outputs the analog signal.

The storage device 919 is a device for storing data configured as an example of a storage unit of the electronic device 100. The storage device 919 includes, for example, a magnetic storage device such as a HDD (Hard Disk Drive), a semiconductor storage device, an optical storage device, a magneto-optical storage device, or the like. This storage device 919 stores programs to be executed by the CPU 901 and various types of data, externally obtained various types of data, and the like. The drive 921 is a reader/writer for a recording medium, and is built in the electronic device 100 or attached externally thereto. The drive 921 reads information recorded in the attached removable recording medium 927 such as a magnetic disk, an optical disc, a magneto-optical disk, or a semiconductor memory, and outputs the read information to the RAM 905. Furthermore, the drive 921 can write records in the attached removable recording medium 927 such as a magnetic disk, an optical disc, a magneto-optical disk, or a semiconductor memory. The removable recording medium 927 is, for example, a DVD medium, an HD-DVD medium, a Blu-ray medium, or the like. In addition, the removable recording medium 927 may be a CompactFlash (CF; registered trademark), a flash memory, an SD memory card (Secure Digital Memory Card), or the like. Further, the removable recording medium 927 may be, for example, an IC card (Integrated Circuit Card) equipped with a non-contact IC chip, an electronic appliance, or the like.

The connection port 923 is a port for allowing devices to directly connect to the electronic device 100. Examples of the connection port 923 include a USB (Universal Serial Bus) port, an IEEE1394 port, a SCSI (Small Computer System Interface) port, and the like. Other examples of the connection port 923 include an RS-232C port, an optical digital terminal, a High-Definition Multimedia Interface (HDMI) port, and the like. By connecting the external connection apparatus 929 to this connection port 923, the electronic device 100 directly acquires various types of data from the external connection apparatus 929 and provides various types of data to the external connection apparatus 929. Note that the above-described optical digital terminal can be configured as the light transmitting and receiving section 110 including the above-described optical communication connector 10B.

The communication device 925 is a communication interface including, for example, a communication device or the like for connecting to a communication network 931. In the present embodiment, the communication device 925 includes the light transmitting and receiving section 110 including the above-described optical communication connector 10B. The communication device 925 may be a router for optical communication. In addition, the communication device 925 further includes, for example, a communication card or the like for a wired or wireless LAN (Local Area Network), Bluetooth (registered trademark), or WUSB (Wireless USB). Further, the communication device 925 may include a router for DSL (Asymmetric Digital Subscriber Line), a modem for various types of communication, or the like. This communication device 925 can transmit and receive signals and the like in accordance with a predetermined protocol, for example, FTTx such as FTTR, FTTB, FTTH or FTTD, TCP/IP, or the like, on the Internet and with other communication devices, for example. In addition, the communication network 931 connected to the communication device 925 includes a network and the like which is connected in a wire or wireless manner, and may be, for example, the Internet, a home LAN, infrared communication, radio wave communication, satellite communication, or the like.

(Optical Communication Cable)

The optical communication cable 200 includes the cable body 201 and the optical communication connector 10A. The cable body 201 internally has the optical transmission path 202A. The optical transmission path 202A is an optical fiber, for example. Note that the optical transmission path 202A is not particularly limited as long as light can be transmitted, and may be other than an optical fiber. The optical transmission path 202A has a coating on the outer peripheral surface as necessary. In addition, the optical communication connector 10A is connected to the leading end side of the optical transmission path 202A.

Such an optical communication cable 200 can be used for a connection for optical communication between an electronic device such as the electronic device 100 as described above and another device.

2. Second Embodiment

Hereinafter, a second embodiment of the present disclosure will be described in detail with reference to FIG. 6 to FIG. 8.

Figure 6:
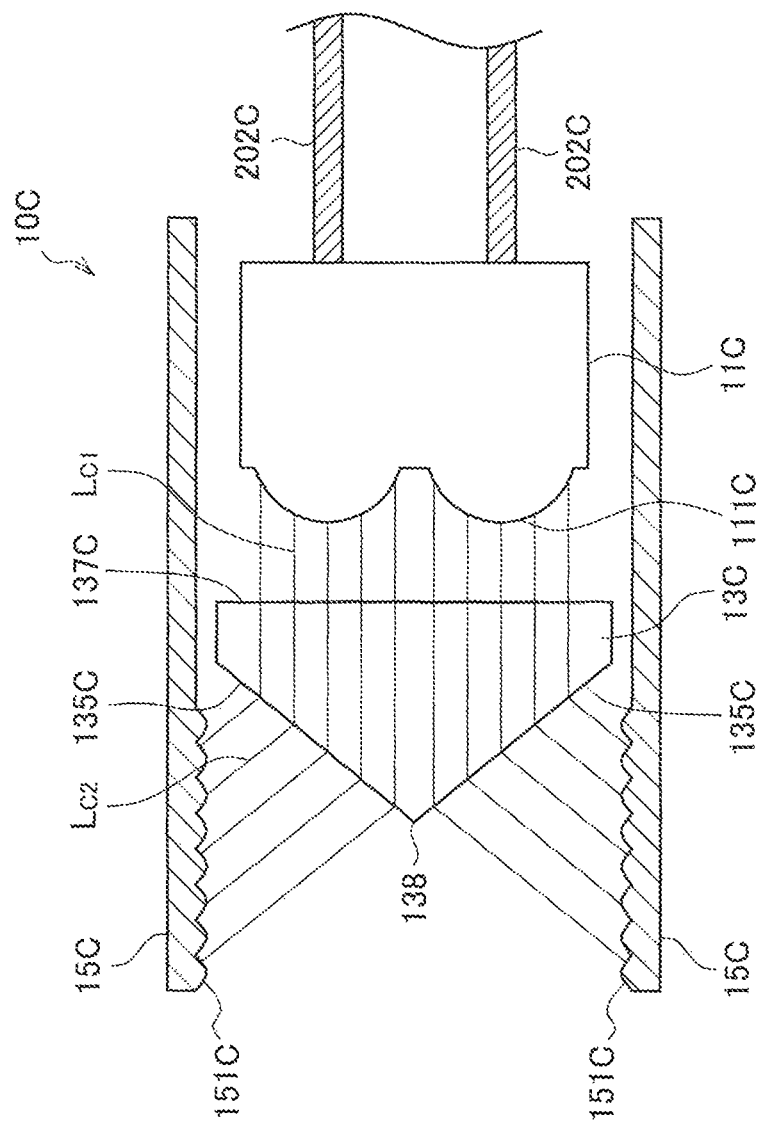
FIG. 6 is an enlarged sectional view of an optical communication connector according to a second embodiment of the present disclosure.
Figure 7:
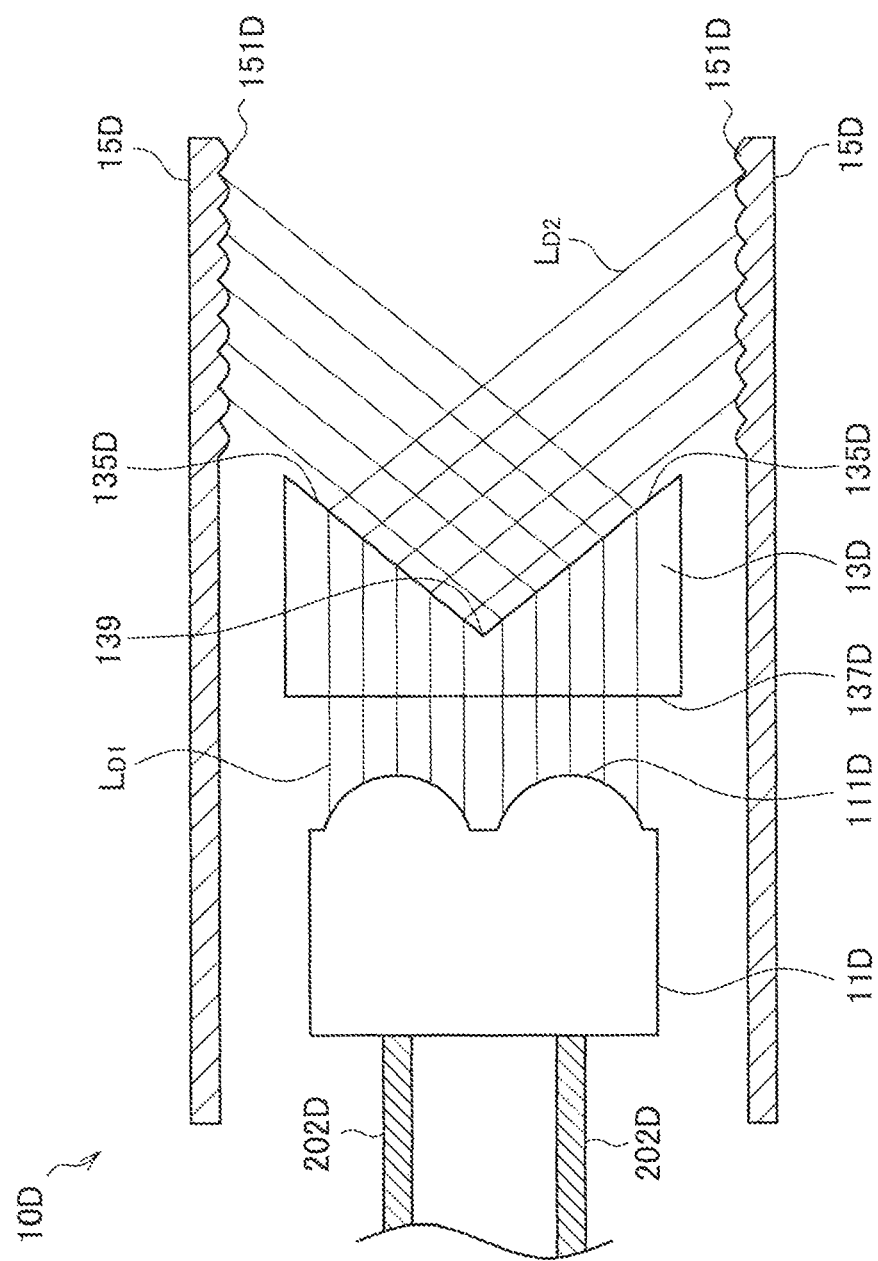
FIG. 7 is an enlarged sectional view of an optical communication connector according to a second embodiment of the present disclosure.
Figure 8:
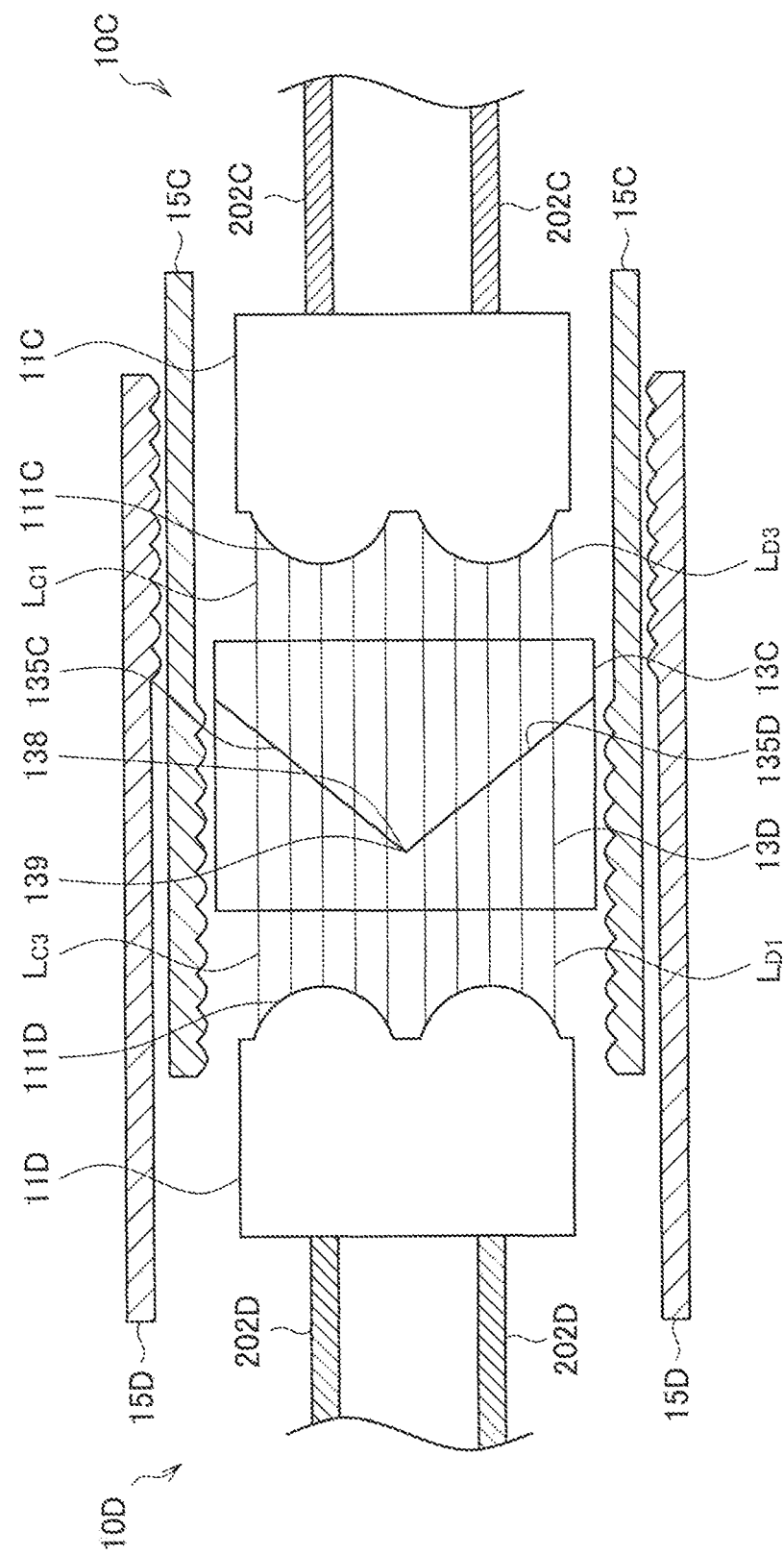
FIG. 8 is an enlarged sectional view illustrating a connection state of the optical communication connectors illustrated in FIG. 6 and FIG. 7.

FIG. 6 is an enlarged sectional view of an optical communication connector 10C according to the second embodiment of the present disclosure, FIG. 7 is an enlarged sectional view of an optical communication connector 10D according to the second embodiment of the present disclosure, and FIG. 8 is an enlarged sectional view illustrating a connection state of the optical communication connectors 10C and 10D illustrated in FIG. 6 and FIG. 7. The optical communication connectors 10C and 10D according to the present embodiment differ from the optical communication connectors 10A, 10B according to the first embodiment in that refracting sections 13C and 13D are different in shape, and accordingly, optical paths of light from the optical transmission paths 202C, 202D are different. In addition, a different point of an electronic device and an optical communication cable according to the present embodiment from the electronic device 100 and the optical communication cable 200 according to the first embodiment is only a different point concerning the optical communication connectors 10C and 10D. Hereinafter, the different point from the first embodiment of the present embodiment will be mainly described, and description of similar matters will be omitted.

The refracting section 13C of the optical communication connector 10C illustrated in FIG. 6 is a prism structured and arranged so as to refract a parallel light Lci ejected from a lens section 11C to eject a refracted light $L_{C2}$. The refracting section 13C is arranged on the leading end side with respect to the lens section 11C. In addition, the refracting section 13C is extended in the width direction (the depth direction in the drawing) as necessary so as to be capable of receiving the parallel light $L_{C1}$ from each of collimating lenses 111C arranged in the lens section 11C. Note that the illustrated mode is not a limitation, but the refracting section 13C can also be extended or shortened in the thickness direction in correspondence to the arrangement of the collimating lenses 111C.

A surface of the refracting section 13C on the base end side, on the input side of the parallel light $L_{C1}$ forms such a flat surface 137C that is substantially perpendicular to the parallel light $L_{C1}$. Accordingly, the parallel light $L_{C1}$ input to the refracting section 13C travels in the refracting section 13C without being refracted.

On the other hand, a surface of the refracting section 13C on the leading end side, that is, on the output side of the refracting section 13C includes a plurality of refracting surfaces 135C having different angles from one another with respect to incident light (the parallel light $L_{C1}$) from the collimating lenses 111C. In the present embodiment, the refracting section 13C has two refracting surfaces 135C on the leading end side, and they form a projection in which a centerline 138 serves as a vertex. Accordingly, the parallel light $L_{C1}$ intruded into the refracting surface 135C is refracted to turn into the refracted light $LC_2$ that is directed to the outer side with respect to the centerline 138. Note that the refracted light La is scattered in a scattering section 151C of a scattering member 15C present on the traveling direction.

Note that an anti-reflection section and/or a surface protection section may be formed in the refracting surface 135C.

In addition, a constituent material of the refracting section 13C can be similar to the constituent material of the refracting section 13A described above.

The refracting section 13D of the optical communication connector 10D illustrated in FIG. 7 is also a prism structured and arranged so as to refract a parallel light $L_{D1}$ ejected from a lens section 11D to eject a refracted light $L_{D2}$. In addition, the refracting section 13D is extended in the width direction (the depth direction in the drawing) as necessary so as to be capable of receiving the parallel light $L_{D1}$ from each of collimating lenses 111D arranged in the lens section 11D. Note that the illustrated mode is not a limitation, but the refracting section 13D can also be extended or shortened in the thickness direction in correspondence to the arrangement of the collimating lenses 111D.

A surface of the refracting section 13D on the base end side, on the input side of the parallel light $L_{D1}$, forms such a flat surface 137D that is substantially perpendicular to the parallel light $L_{D1}$. Accordingly, the parallel light $L_{D1}$ input to the refracting section 13D travels in the refracting section 13D without being refracted.

On the other hand, a surface of the refracting section 13D on the leading end side, that is, on the output side of the refracting section 13D, includes a plurality of refracting surfaces 135D having different angles from one another with respect to incident light (the parallel light $L_{D1}$) from the collimating lenses 111D. In the present embodiment, the refracting section 13D has two refracting surfaces 135D on the leading end side, and they form a recess in which a centerline 139 serves as a bottom. Accordingly, the parallel light $L_{D1}$ intruded into the refracting surface 135D is refracted to turn into the refracted light $L_{D2}$ that is directed to the centerline 139 side. Note that the refracted light $L_{D2}$ is scattered in a scattering section 151D of a scattering member 15D present on the traveling direction.

In addition, the refracting surface 135D of the refracting section 13D has a shape, for example, area, angle, and the like corresponding to the refracting surface 135C of the refracting section 13C opposed during connection. Such a refracting surface 135D can refract again a refracted light (the refracted light $L_{C2}$ in FIG. 6) ejected by the refracting surface 135C of the refracting section 13C to turn into a parallel light $L_{C3}$, and transmit the parallel light $L_{C3}$ to the collimating lens 111D, as illustrated in FIG. 8.

In addition, an anti-reflection section and/or a surface protection section may be formed in the refracting surface 135D.

In addition, a constituent material of the refracting section 13D can be similar to the constituent material of the refracting section 13A described above.

In a case where the optical communication connectors 10C and 10D as described above are not connected to each other, that is, during non-optical coupling, parallel light is prevented from being directly emitted to the outside of the optical communication connectors 10C, 10D because of the refracting sections 13C, 13D and the scattering sections 151C, 151D, as described above. On the other hand, as illustrated in FIG. 8 and as will be described later, when the optical communication connectors 10C, 10D are connected, an optical signal passing through the two refracting sections 13C, 13D turns into parallel light again, and optical coupling becomes possible.

As illustrated in FIG. 8, the optical communication connectors 10C, 10D are arranged such that, when they are connected, the refracting surfaces 135C, 135D of the refracting sections 13C, 13C are opposed to each other. In this case, first, light discharged from the optical transmission path 202C is collimated in the lens section 11C to turn into the parallel light $L_{C1}$. Then, the parallel light $L_{C1}$ is input to the refracting section 13C, and is refracted by the refracting surfaces 135C to be ejected from the refracting section 13C. Then, the refracted light is immediately input to the opposed refracting surface 135D of the refracting section 13D, and is refracted again to turn into the parallel light $L_{C3}$ parallel to $L_{C1}$. The parallel light $L_{C3}$ is collected in the lens section 11D, and is transported to the optical transmission path 202D.

Similarly, light discharged from the optical transmission path 202D is collimated in the lens section 11D to turn into the parallel light $L_{D1}$. Then, the parallel light $L_{D1}$ is input to the refracting section 13D, and is refracted by the refracting surface 135D to be ejected from the refracting section 13D. Then, the refracted light is immediately input to the opposed refracting surface 135C of the refracting section 13C, and is refracted again to turn into the parallel light $L_{D3}$ parallel to $L_{D1}$. The parallel light $L_{D3}$ is collected in the lens section 11C, and is transported to the optical transmission path 202C. From the foregoing, bidirectional transmission of an optical signal between the electronic device and the optical communication cable via the optical communication connectors 10C, 10D becomes possible.

In addition, in the optical communication connectors 10C, 10D, the collimating lenses 111C, 111D and the optical transmission paths 202C, 202D are not exposed to an external environment since the refracting sections 13C, 13D are arranged on the leading end side. Therefore, the need for cleaning the optical transmission paths 202C, 202D and the collimating lenses 111C, 111D is eliminated, and maintenance properties are excellent. Further, since the leading end sides of the refracting sections 13A, 13B form the recess and projection, it is easy to align the optical communication connectors 10C, 10D to each other when connecting them.

3. Application Examples

The technology according to an embodiment of the present disclosure is applicable to a variety of products. For example, the technology according to an embodiment of the present disclosure may be implemented as devices mounted on any type of vehicles such as automobiles, electric vehicles, hybrid electric vehicles, and motorcycles.

Figure 9:
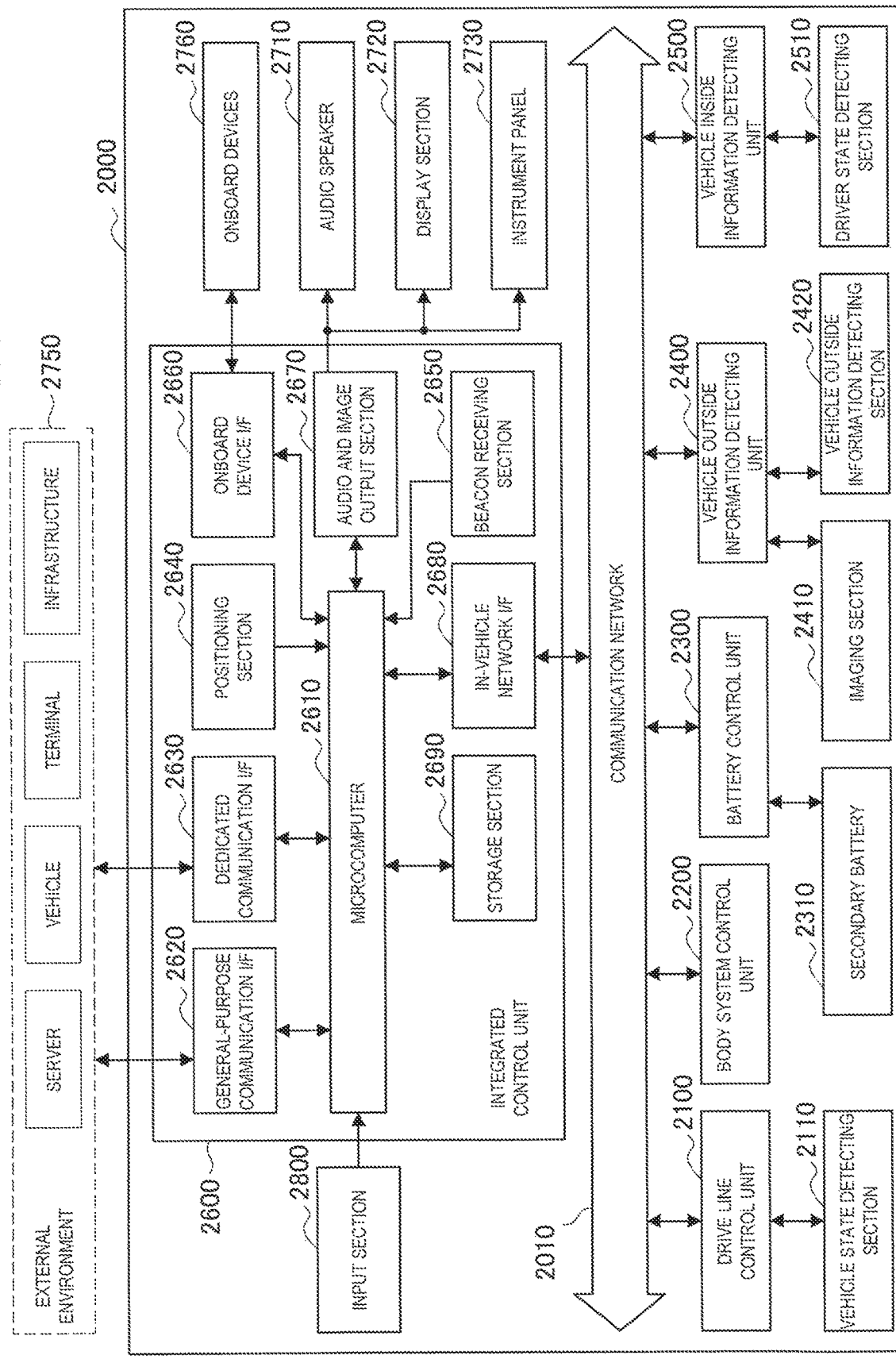
FIG. 9 is a block diagram illustrating a schematic configuration example of a vehicle control system.

FIG. 9 is a block diagram illustrating a schematic configuration example of a vehicle control system 2000 to which the technology according to an embodiment of the present disclosure can be applied. The vehicle control system 2000 includes electronic control units connected via a communication network 2010. In the example illustrated in FIG. 9, the vehicle control system 2000 includes a drive line control unit 2100, a body system control unit 2200, a battery control unit 2300, a vehicle outside information detecting unit 2400, a vehicle inside information detecting unit 2500, and an integrated control unit 2600. The communication network 2010, which connects these control units, may be an in-vehicle communication network such as a controller area network (CAN), a local interconnect network (LIN), a local area network (LAN), or FlexRay (registered trademark) that is compliant with any standard.

Each control unit includes a microcomputer that performs operation processing in accordance with a variety of programs, a storage section that stores the programs, parameters used for the variety of operations, or the like executed by the microcomputer, and a driving circuit that drives devices subjected to various types of control. Each control unit includes a network I/F used to communicate with the other control units via the communication network 2010, and a communication I/F used to communicate with devices, sensors, or the like outside and inside the vehicle through wired communication or wireless communication. FIG. 9 illustrates a microcomputer 2610, a general-purpose communication I/F 2620, a dedicated communication I/F 2630, a positioning section 2640, a beacon receiving section 2650, an onboard device I/F 2660, an audio and image output section 2670, an in-vehicle network I/F 2680, and a storage section 2690 as the functional configuration of the integrated control unit 2600. Each of the other control units similarly includes a microcomputer, a communication I/F, a storage section, and the like.

The drive line control unit 2100 controls the operation of devices related to the drive line of the vehicle in accordance with a variety of programs. For example, the drive line control unit 2100 functions as a control device for a driving force generating device such as an internal combustion engine or a driving motor that generates the driving force of the vehicle, a driving force transferring mechanism that transfers the driving force to wheels, a steering mechanism that adjusts the steering angle of the vehicle, a braking device that generates the braking force of the vehicle, and the like. The drive line control unit 2100 may have the function of a control device for an antilock brake system (ABS) or an electronic stability control (ESC).

The drive line control unit 2100 is connected to a vehicle state detecting section 2110. The vehicle state detecting section 2110 includes, for example, at least one of sensors such as a gyro sensor that detects the angular velocity of the axial rotating motion of the vehicle body, an acceleration sensor that detects the acceleration of the vehicle, or a sensor that detects the operation amount of the accelerator pedal, the operation amount of the brake pedal, the steering wheel angle of the steering wheel, the engine speed, the wheel rotation speed, or the like. The drive line control unit 2100 uses a signal input from the vehicle state detecting section 2110 to perform operation processing, and controls the internal combustion engine, the driving motors, the electric power steering device, the braking device, or the like.

The body system control unit 2200 controls the operations of a variety of devices attached to the vehicle body in accordance with a variety of programs. For example, the body system control unit 2200 functions as a control device for a keyless entry system, a smart key system, a power window device, or a variety of lights such as a headlight, a backup light, a brake light, a blinker, or a fog lamp. In this case, the body system control unit 2200 can receive radio waves transmitted from a portable device that serves instead of the key or signals of a variety of switches. The body system control unit 2200 receives these radio waves or signals, and controls the vehicle door lock device, the power window device, the lights, or the like.

The battery control unit 2300 controls a secondary battery 2310 in accordance with a variety of programs. The secondary battery 2310 serves as a power supply source of a driving motor. For example, the battery control unit 2300 receives information such as the battery temperature, the battery output voltage, or the remaining battery capacity from a battery device including the secondary battery 2310. The battery control unit 2300 uses these signals to perform operation processing, and performs temperature adjusting control on the secondary battery 2310 or controls a cooling device or the like included in the battery device.

The vehicle outside information detecting unit 2400 detects information on the outside of the vehicle including the vehicle control system 2000. For example, the vehicle outside information detecting unit 2400 is connected to at least one of an imaging section 2410 and a vehicle outside information detecting section 2420. The imaging section 2410 includes at least one of a time of flight (ToF) camera, a stereo camera, a monocular camera, an infrared camera, and other cameras. The vehicle outside information detecting section 2420 includes, for example, an environment sensor that detects the current weather, and a surrounding information detecting sensor that detects another vehicle, an obstacle, a pedestrian, or the like around the vehicle including the vehicle control system 2000.

The environment sensor may be, for example, at least one of a raindrop sensor that detects rainy weather, a fog sensor that detects a fog, a sunshine sensor that detects the degree of sunshine, a snow sensor that detects a snowfall. The surrounding information detecting sensor may be at least one of an ultrasonic sensor, a radar device, and a light detection and ranging/laser imaging detection and ranging (LIDAR) device. These imaging section 2410 and vehicle outside information detecting section 2420 may be installed as independent sensors or devices, or as a device into which sensors and devices are integrated.

Figure 10:
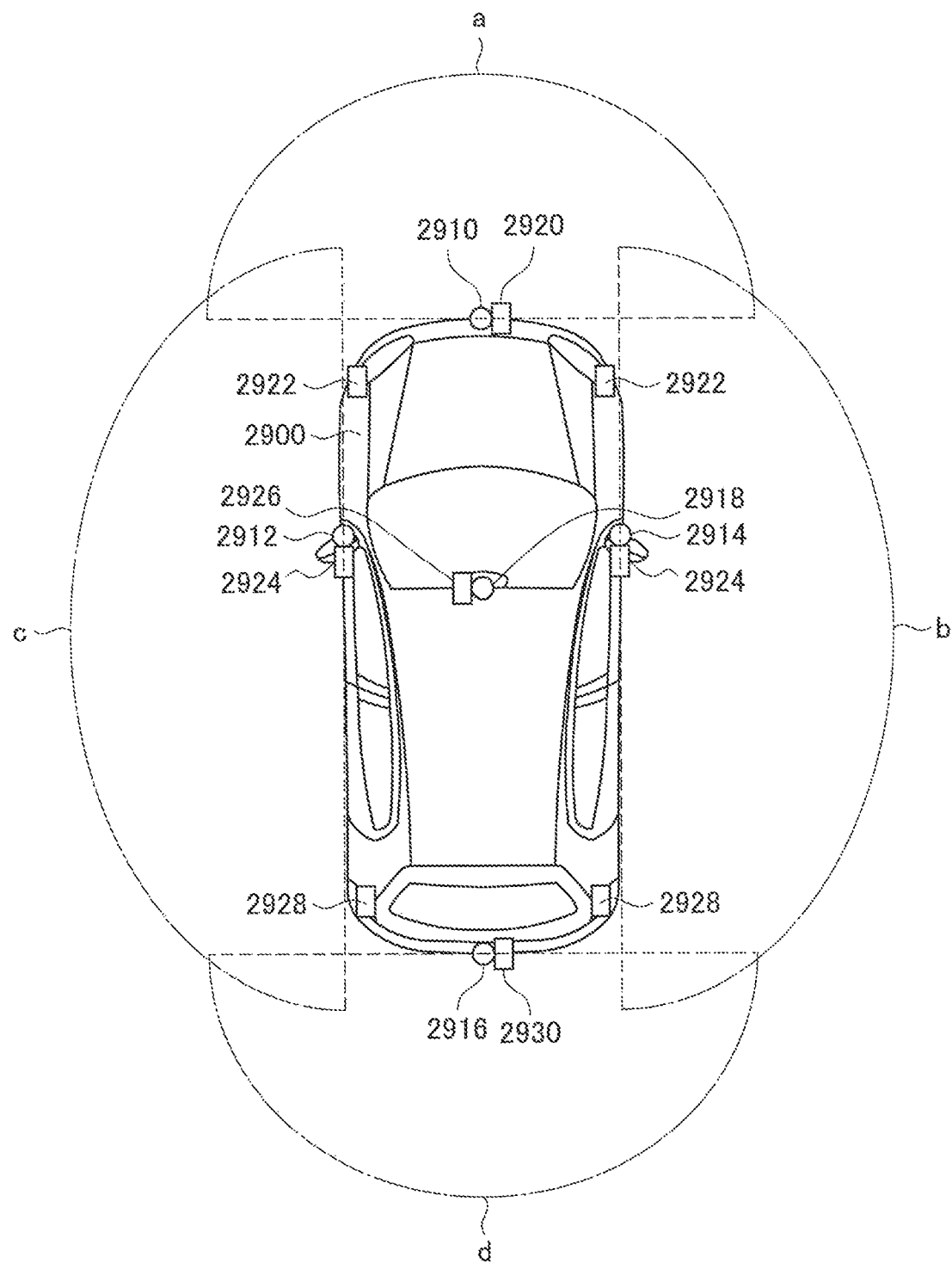
FIG. 10 is an explanatory diagram illustrating an example of installation positions of a vehicle outside information detecting section and an imaging section.

FIG. 10 illustrates an example of installation positions of the imaging section 2410 and the vehicle outside information detecting section 2420. Imaging sections 2910, 2912, 2914, 2916, and 2918 are positioned, for example, at least one of the front nose, a side mirror, the rear bumper, the back door, and the upper part of the windshield in the vehicle compartment of a vehicle 2900. The imaging section 2910 attached to the front nose and the imaging section 2918 attached to the upper part of the windshield in the vehicle compartment chiefly acquire images of the area ahead of the vehicle 2900. The imaging sections 2914 and 2912 attached to the side mirrors chiefly acquire images of the areas on the sides of the vehicle 2900. The imaging section 2916 attached to the rear bumper or the back door chiefly acquires images of the area behind the vehicle 2900. The imaging section 2918 attached to the upper part of the windshield in the vehicle compartment is used chiefly to detect a preceding vehicle, a pedestrian, an obstacle, a traffic light, a traffic sign, a lane, or the like.

Additionally, FIG. 10 illustrates an example of the respective imaging ranges of the imaging sections 2910, 2912, 2914, and 2916. An imaging range a represents the imaging range of the imaging section 2910 attached to the front nose. Imaging ranges b and c respectively represent the imaging ranges of the imaging sections 2914 and 2912 attached to the side mirrors. An imaging range d represents the imaging range of the imaging section 2916 attached to the rear bumper or the back door. For example, overlaying image data captured by the imaging sections 2910, 2914, 2912, and 2916 offers an overhead image that looks down on the vehicle 2900.

Vehicle outside information detecting sections 2920, 2922, 2924, 2926, 2928, and 2930 attached to the front, the rear, the sides, the corners, and the upper part of the windshield in the vehicle compartment of the vehicle 2900 may be, for example, ultrasonic sensors or radar devices. The vehicle outside information detecting sections 2920, 2926, and 2930 attached to the front nose, the rear bumper, the back door, and the upper part of the windshield in the vehicle compartment of the vehicle 2900 may be, for example, LIDAR devices. These vehicle outside information detecting sections 2920 to 2930 are used chiefly to detect a preceding vehicle, a pedestrian, an obstacle, or the like.

The description will continue with reference to FIG. 9 again. The vehicle outside information detecting unit 2400 causes the imaging section 2410 to capture images of the outside of the vehicle, and receives the captured image data. Further, the vehicle outside information detecting unit 2400 receives detection information from the connected vehicle outside information detecting section 2420. In a case where the vehicle outside information detecting section 2420 is an ultrasonic sensor, a radar device, or a LIDAR device, the vehicle outside information detecting unit 2400 causes ultrasound, radio waves, or the like to be transmitted, and receives the information of the received reflected waves. The vehicle outside information detecting unit 2400 may perform a process of detecting an object such as a person, a car, an obstacle, a traffic sign, or a letter on a road, or a process of detecting the distance on the basis of the received information. The vehicle outside information detecting unit 2400 may perform an environment recognition process of recognizing a rainfall, a fog, a road condition, or the like on the basis of the received information. The vehicle outside information detecting unit 2400 may compute the distance to an object outside the vehicle on the basis of the received information.

Further, the vehicle outside information detecting unit 2400 may perform an image recognition process of recognizing a person, a car, an obstacle, a traffic sign, a letter on a road, or the like, or a process of detecting the distance on the basis of the received image data. The vehicle outside information detecting unit 2400 may perform a distortion correcting process, a positioning process, or the like on the received image data, and combine image data captured by a different imaging section 2410 to generate an overhead view or a panoramic image. The vehicle outside information detecting unit 2400 may use the image data captured by the other imaging section 2410 to perform a viewpoint converting process.

The vehicle inside information detecting unit 2500 detects information on the inside of the vehicle. The vehicle inside information detecting unit 2500 is connected, for example, to a driver state detecting section 2510 that detects the state of the driver. The driver state detecting section 2510 may include a camera that images the driver, a biological sensor that detects biological information of the driver, a microphone that picks up a sound in the vehicle compartment, or the like. The biological sensor is attached, for example, to a seating face, the steering wheel, or the like, and detects biological information of the passenger sitting on the seat or the driver gripping the steering wheel. The vehicle inside information detecting unit 2500 may compute the degree of the driver's tiredness or the degree of the driver's concentration or determine whether the driver have a doze, on the basis of detection information input from the driver state detecting section 2510. The vehicle inside information detecting unit 2500 may perform a process such as a noise cancelling process on the picked-up audio signal.

The integrated control unit 2600 controls the overall operation inside the vehicle control system 2000 in accordance with a variety of programs. The integrated control unit 2600 is connected to an input section 2800. The input section 2800 is implemented as a device such as a touch panel, a button, a microphone, a switch, or a lever on which a passenger can perform an input operation. The input section 2800 may be, for example, a remote control device that uses infrared light or other radio waves, or an external connection device such as a mobile telephone or a personal digital assistant (PDA) corresponding to the operation of the vehicle control system 2000. The input section 2800 may be, for example, a camera. In that case, a passenger can input information through gesture. Moreover, the input section 2800 may include an input control circuit or the like that generates an input signal, for example, on the basis of information input by a passenger or the like using the above-described input section 2800, and outputs the generated input signal to the integrated control unit 2600. The passenger or the like operates this input section 2800, thereby inputting various types of data to the vehicle control system 2000 or instructing the vehicle control system 2000 about a processing operation.

The storage section 2690 may include a read only memory (ROM) that stores a variety of programs to be executed by a microcomputer, and a random access memory (RAM) that stores a variety of parameters, operation results, sensor values, or the like. Further, the storage section 2690 may be implemented as a magnetic storage device such as a hard disk drive (HDD), a semiconductor storage device, an optical storage device, a magneto-optical storage device, or the like. The general-purpose communication I/F 2620 is a general-purpose communication I/F that mediates in communication between a variety of devices in an external environment 2750. The general-purpose communication I/F 2620 may implement a cellular communication protocol such as Global System of Mobile communications (GSM), WiMAX, Long Term Evolution (LTE) or LTE-Advanced (LTE-A), or other wireless communication protocols such as a wireless LAN (which is also referred to as Wi-Fi (registered trademark)). The general-purpose communication I/F 2620 may be connected to a device (such as an application server or a control server) on an external network (such as the Internet, a cloud network, or a network specific to a service provider), for example, via a base station or an access point. Further, the general-purpose communication I/F 2620 may be connected to a terminal (such as a terminal of a pedestrian or a store, or a machine type communication (MTC) terminal) in the vicinity of the vehicle, for example, using the peer-to-peer (P2P) technology.

The dedicated communication I/F 2630 is a communication I/F that supports a communication protocol defined for the purpose of use for vehicles. The dedicated communication I/F 2630 may implement a standard protocol such as wireless access in vehicle environment (WAVE), which is a combination of IEEE 802.11p for the lower layer and IEEE 1609 for the upper layer, or dedicated short range communications (DSRC). The dedicated communication I/F 2630 typically performs V2X communication. The V2X communication is a concept including one or more of vehicle-to-vehicle communication, vehicle-to-infrastructure communication, and vehicle-to-pedestrian communication.

The positioning section 2640 receives, for example, global navigation satellite system (GNSS) signals (such as global positioning system (GPS) signals from a GPS satellite) from a GNSS satellite for positioning, and generates position information including the latitude, longitude, and altitude of the vehicle. Additionally, the positioning section 2640 may also identify the present position by exchanging signals with a wireless access point, or acquire position information from a terminal such as a mobile phone, a PHS, or a smartphone that has a positioning function.

The beacon receiving section 2650 receives radio waves or electromagnetic waves, for example, from a wireless station or the like installed on the road, and acquires information such as the present position, traffic congestion, closed roads, or necessary time. Additionally, the function of the beacon receiving section 2650 may be included in the above-described dedicated communication I/F 2630.

The onboard device I/F 2660 is a communication interface that mediates in connections between the microcomputer 2610 and a variety of devices in the vehicle. The onboard device I/F 2660 may use a wireless communication protocol such as a wireless LAN, Bluetooth (registered trademark), near field communication (NFC), or a wireless USB (WUSB) to establish a wireless connection. Further, the onboard device I/F 2660 may also establish a wired connection via a connection terminal (not illustrated) (and a cable if necessary). The onboard devices I/2660 may include, for example, at least one of a mobile device of a passenger, a wearable device of a passenger, and an information device carried into or attached to the vehicle. The onboard device I/F 2660 exchanges control signals or data signals with, for example, a mobile device or a wearable device that a passenger has, or an information device carried into or attached to the vehicle.

The in-vehicle network I/F 2680 is an interface that mediates in communication between the microcomputer 2610 and the communication network 2010. The in-vehicle network I/F 2680 transmits and receives signals or the like in compliance with a predetermined protocol supported by the communication network 2010.

The microcomputer 2610 of the integrated control unit 2600 controls the vehicle control system 2000 in accordance with a variety of programs on the basis of information acquired via at least one of the general-purpose communication I/F 2620, the dedicated communication I/F 2630, the positioning section 2640, the beacon receiving section 2650, the onboard device I/F 2660, and the in-vehicle network I/F 2680. For example, the microcomputer 2610 may calculate a control target value of the driving force generating device, the steering mechanism, or the braking device on the basis of acquired information on the inside and outside of the vehicle, and output a control instruction to the drive line control unit 2100. For example, the microcomputer 2610 may perform cooperative control for the purpose of executing the functions of vehicle collision avoidance or impact reduction, follow-up driving based on the inter-vehicle distance, constant vehicle speed driving, automatic driving or the like.

The microcomputer 2610 may create local map information including surrounding information on the present position of the vehicle on the basis of information acquired via at least one of the general-purpose communication I/F 2620, the dedicated communication I/F 2630, the positioning section 2640, the beacon receiving section 2650, the onboard device I/F 2660, and the in-vehicle network I/F 2680. Further, the microcomputer 2610 may predict danger such as vehicle collisions, approaching pedestrians or the like, or entry to closed roads on the basis of acquired information, and generate a warning signal. The warning signal may be, for example, a signal used to generate a warning sound or turn on the warning lamp.

The audio and image output section 2670 transmits an output signal of at least one of a sound and an image to an output device capable of visually or aurally notifying a passenger of the vehicle or the outside of the vehicle of information. In the example of FIG. 9, an audio speaker 2710, a display section 2720, and an instrument panel 2730 are exemplified as the output device. For example, the display section 2720 may include at least one of an onboard display and a head-up display. The display section 2720 may have an augmented reality (AR) display function. The output device may also be a device other than these devices like a headphone, a projector, or a lamp. In a case where the output device is a display device, the display device visually displays a result obtained by the microcomputer 2610 performing a variety of processes or information received from another control unit in a variety of forms such as text, images, tables, or graphs. Further, in a case where the output device is an audio output device, the audio output device converts audio signals including reproduced audio data, acoustic data, or the like into analog signals, and aurally outputs the analog signals.

Additionally, in the example illustrated in FIG. 9, at least two control units connected via the communication network 2010 may be integrated into a single control unit. Alternatively, the individual control units may be configured as control units. Moreover, the vehicle control system 2000 may also include another control unit that is not illustrated. Further, a part or the whole of the functions executed by any of the control units may be executed by another control unit in the above description. That is, as long as information is transmitted and received via the communication network 2010, predetermined operation processing may be performed by any of the control units. Similarly, a sensor or a device connected to any of the control units may be connected to another control unit, and the control units may transmit and receive detection information to and from each other via the communication network 2010.

In the vehicle control system 2000 described above, the optical communication connectors 10A to 10D described using FIG. 1 to FIG. 8 can be applied to various interfaces illustrated in FIG. 9. For example, the optical communication connectors 10A to 10D are applicable as communication connectors in the general-purpose communication I/F 2620, the dedicated communication I/F 2630, the onboard device I/F 2660, the audio and image output section 2670, the in-vehicle network I/F 2680, the external environment 2750 corresponding to this, an onboard device 2760, the audio speaker 2710, the display section 2720, the instrument panel 2730, the communication network 2010, and the like. In addition, the electronic device according to the present disclosure, for example, the electronic device 100 can be applied to the integrated control unit 2600, for example. Further, the optical communication cable according to the present disclosure, for example, the optical communication cable 200 is applicable for connection to each interface and device inside/outside the vehicle control system 2000, besides the communication network 2010.

In addition, at least some structural elements of the electronic device 100 described using FIG. 1 and FIG. 5 may be achieved in a module (for example, an integrated circuit module including a single die) for the integrated control unit 2600 illustrated in FIG. 9. Alternatively, the electronic device 100 described using FIG. 5 may be achieved by a plurality of control units of the vehicle control system 2000 illustrated in FIG. 9.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it has been described in the above-described embodiments that the optical communication connector 10A is arranged in the optical communication cable 200 and the optical communication connector 10B is arranged in the electronic device 100, whilst the arrangement of the optical communication connectors 10A, 10B is not limited to the foregoing. For example, the optical communication connector 10A may be arranged in the electronic device 100, and the optical communication connector 10B may be arranged in the optical communication cable 200. The same applies to the optical communication connectors 10C, 10D.

In addition, the shape of the refracting sections 13A to 10D of the optical communication connectors 10A to 10D is not limited to the illustrated mode as long as the parallel lights $L_{A1}$ to $L_{D1}$ from the collimating lenses 111A to 111D can be refracted. The number of refracting surfaces of the refracting sections can be one or more in accordance with the number of optical signals from the collimating lenses, for example.

In addition, it has been described in the illustrated mode that the flat surfaces 131A, 131B come into contact when the optical communication connector 10A and the optical communication connector 10B are connected, whilst the structure according to the present disclosure is not limited to this. For example, when the optical communication connector 10A and the optical communication connector 10B are connected, the flat surfaces 131A, 131B can be separated. In this case, the inclination angles of the refracting surfaces 133A, 133B may be adjusted as necessary to adjust the optical paths in the refracting sections 13A, 13B as necessary.

Similarly, it has been described in the illustrated mode that the refracting surfaces 135C, 135D come into contact when the optical communication connector 10C and the optical communication connector 10D are connected, whilst the structure according to the present disclosure is not limited to this. For example, when the optical communication connector 10C and the optical communication connector 10D are connected, the refracting surfaces 135C, 135D can be separated. In this case, the inclination angles of the refracting surfaces 135C, 135D may be adjusted as necessary to adjust the optical paths in the refracting sections 13C, 13D as necessary.

In addition, it has been described in the above-described embodiments that the anti-reflection section is present on the light output side (leading end side) of the refracting sections 13A to 13D, whilst the structure according to the present disclosure is not limited to this. The anti-reflection section may also be arranged on the light input side (the base end side) of the refracting sections, for example.

In addition, it has been described in the illustrated mode that the scattering sections 151A to 151D of the optical communication connectors 10A to 10D scatter all of the refracted lights $L_{A2}$ to $L_{D2}$, whilst the structure according to the present disclosure is not limited to this. For example, the scattering sections 151A to 151D may scatter only a part of the refracted lights $L_{A2}$ to $L_{D2}$. For example, it is possible to adjust as necessary the degree that the scattering sections 151A to 151D scatter the refracted lights $L_{A2}$ to $L_{D2}$ so as to meet the above-described international standards (IEC 60825-1, 2).

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An optical communication connector device including:
a collimating lens configured to collimate light from an optical transmission path;
a refracting section arranged on a leading end side with respect to the collimating lens, and configured to refract and eject light from the optical transmission path ejected from the collimating lens; and
a scattering section configured to scatter at least a part of the light ejected from the refracting section.

(2)
The optical communication connector according to (1), in which
a surface of the refracting section on a light ejection side forms a flat surface.

(3)
The optical communication connector according to (1) or (2), in which
a surface of the refracting section on a light input side includes a plurality of refracting surfaces having different angles from one another with respect to incident light from the collimating lens, and
the plurality of refracting surfaces refract lights from the optical transmission path collimated by the collimating lens so as to cross each other.

(4)
The optical communication connector according to any one of (1) to (3), in which
the refracting section has two refracting surfaces on a light input side, and
a projection is formed by the two refracting surfaces.

(5)
The optical communication connector according to any one of (1) to (4), in which
when connecting a second optical communication connector including another refracting section having a shape identical to a shape of the refracting section such that the refracting section and the other refracting section are opposed symmetrically on an ejection side surface of the refracting section,
the optical communication connector is configured such that the light ejected from the refracting section and passing through the other refracting section turns into parallel light parallel to the light ejected from the collimating lens.

(6)
The optical communication connector according to (1), in which
a surface of the refracting section on a light output side includes a plurality of refracting surfaces having different angles from one another with respect to incident light from the collimating lens.

(7)
The optical communication connector according to (6), in which
the refracting section has two refracting surfaces on the light output side, and
a projection or a recess is formed by the two refracting surfaces.

(8)
The optical communication connector according to (6) or (7), in which
when a second optical communication connector including another refracting section having another refracting surface corresponding to a shape of the refracting surface of the refracting section is connected such that the refracting surface and the other refracting surface are opposed,
the light ejected from the refracting section and passing through the other refracting section turns into parallel light parallel to the light ejected from the collimating lens.

(9)
The optical communication connector according to any one of (1) to (8), in which
the refracting section is a prism.

(10)
The optical communication connector according to any one of (1) to (9), in which
the refracting section includes an anti-reflection section.

(11)
The optical communication connector according to any one of (1) to (10), in which
the refracting section includes a surface protection section in a surface on a light output side.

(12)
The optical communication connector according to any one of (1) to (11), in which the refracting section includes bolycarbonate.

(13)
The optical communication connector according to any one of (1) to (12), in which the scattering section includes an alumite layer.

(14)

An optical communication cable including:

an optical transmission path; and an optical communication connector including a collimating lens configured to collimate light from the optical transmission path, a refracting section arranged on a leading end side with respect to the collimating lens and configured to refract and eject light from the optical transmission path passing through the collimating lens, and a scattering section configured to scatter at least a part of the light ejected from the refracting section.

(15)

An electronic device including:

an optical communication connector including a collimating lens configured to collimate light from an optical transmission path, a refracting section arranged on a leading end side with respect to the collimating lens and configured to refract and eject the light from the optical transmission path passing through the collimating lens, and a scattering section configured to scatter at least a part of the light ejected from the refracting section.

REFERENCE SIGNS LIST 10A, 10B, 10C, 10D optical communication connector
11A, 11B, 11C, 11D lens section
111A, 111B, 111C, 111D collimating lens
13A, 13B, 13C, 13D refracting section
131A, 131B flat surface
133A, 133B refracting surface
135C, 135D refracting surface
137C, 137D flat surface
138, 139 centerline
15A, 15B, 15C, 15D scattering member
151A, 151B, 151C, 151D scattering section
100 electronic device
110 light transmitting and receiving section
120 light emitting section
130 light receiving section
200 optical communication cable
201 cable body
202A, 202B, 202C, 202D optical transmission path
907 host bus
909 bridge
911 external bus
913 interface
915 input device
917 output device
919 storage device
921 drive
923 connection port
925 communication device
927 removable recording medium
929 external connection device
931 communication network
2000 vehicle control system
2010 communication network
2100 drive line control unit
2110 vehicle state detecting section
2200 body system control unit
2300 battery control unit
2310 secondary battery
2400 vehicle outside information detecting unit
2410 imaging section
2420 vehicle outside information detecting section
2500 vehicle inside information detecting unit
2510 driver state detecting section
2600 integrated control unit
2610 microcomputer
2640 positioning section
2650 beacon receiving section
2670 audio and image output section
2690 storage section
2710 audio speaker
2720 display section
2730 instrument panel
2750 external environment
2760 onboard device
2800 input section
2900 vehicle
2910, 2912, 2914, 2916, 2918 imaging section 2920, 2921, 2922, 2923, 2924, 2925, 2926, 2927, 2928, 2929, 2930 vehicle outside information detecting section

What is claimed is:

1. A first optical communication connector device, comprising:

a collimating lens configured to collimate incident light from an optical transmission path;

a refracting section on a leading end side with respect to the collimating lens, wherein the refracting section is configured to refract and eject the incident light from the optical transmission path ejected from the collimating lens, the refracting section has a first surface on a light input side that includes a plurality of refracting surfaces having different angles with respect to the incident light from the collimating lens, and the plurality of refracting surfaces is configured to refract a plurality of lights from the optical transmission path collimated by the collimating lens such that the plurality of lights crosses each other; and a scattering section configured to scatter at least a part of the incident light ejected from the refracting section.

2. The first optical communication connector device according to claim 1, wherein the refracting section has a second surface on a light ejection side, and the second surface is a flat surface.

3. The first optical communication connector device according to claim 1, wherein the plurality of refracting surfaces has two refracting surfaces on the light input side of the refracting section, and a projection is formed by the two refracting surfaces.

4. The first optical communication connector device according to claim 1, wherein the refracting section of the first optical communication connector device is opposed symmetrically to a refracting section of a second optical communication connector based on a connection of the first optical communication connector device and the second optical communication connector device, a shape of the refracting section of the second optical communication connector device is identical to a shape of the refracting section of the first optical communication connector device, and the first optical communication connector device is configured such that the incident light ejected from the refracting section of the first optical communication connector device and passes through the refracting section of the second optical communication connector device turns into parallel light parallel to the incident light ejected from the collimating lens.

5. The first optical communication connector device according to claim 1, wherein
the refracting section is a prism.

6. The first optical communication connector device according to claim 1, wherein
the refracting section includes an anti-reflection section.

7. The first optical communication connector device according to claim 1, wherein
the refracting section includes a surface protection section in a second surface on a light output side.

8. The first optical communication connector device according to claim 1, wherein
the refracting section includes polycarbonate.

9. The first optical communication connector device according to claim 1, wherein
the scattering section includes an oxidized surface of an aluminum layer.

10. An optical communication cable, comprising:
an optical transmission path; and
an optical communication connector device that includes:
  a collimating lens configured to collimate incident light from the optical transmission path;
  a refracting section on a leading end side with respect to the collimating lens wherein
    the refraction section is configured to refract and eject the incident light from the optical transmission path and ejected from the collimating lens,
    the refracting section has a first surface on a light input side that includes a plurality of refracting surfaces having different angles with respect to the incident light from the collimating lens, and
    the plurality of refracting surfaces is configured to refract a plurality of lights from the optical transmission path collimated by the collimating lens such that the plurality of lights crosses each other; and
  a scattering section configured to scatter at least a part of the incident light ejected from the refracting section.

11. An electronic device, comprising:
an optical communication connector device that includes:
  a collimating lens configured to collimate incident light from an optical transmission path;
  a refracting section on a leading end side with respect to the collimating lens wherein
    the refractive section is configured to refract and eject the incident light from the optical transmission path and ejected from the collimating lens,
    the refracting section has a first surface on a light input side that includes a plurality of refracting surfaces having different angles with respect to the incident light from the collimating lens, and
    the plurality of refracting surfaces is configured to refract a plurality of lights from the optical transmission path collimated by the collimating lens such that the plurality of lights crosses each other; and
  a scattering section configured to scatter at least a part of the incident light ejected from the refracting section.

\* \* \* \* \*